Patented Oct. 24, 1944

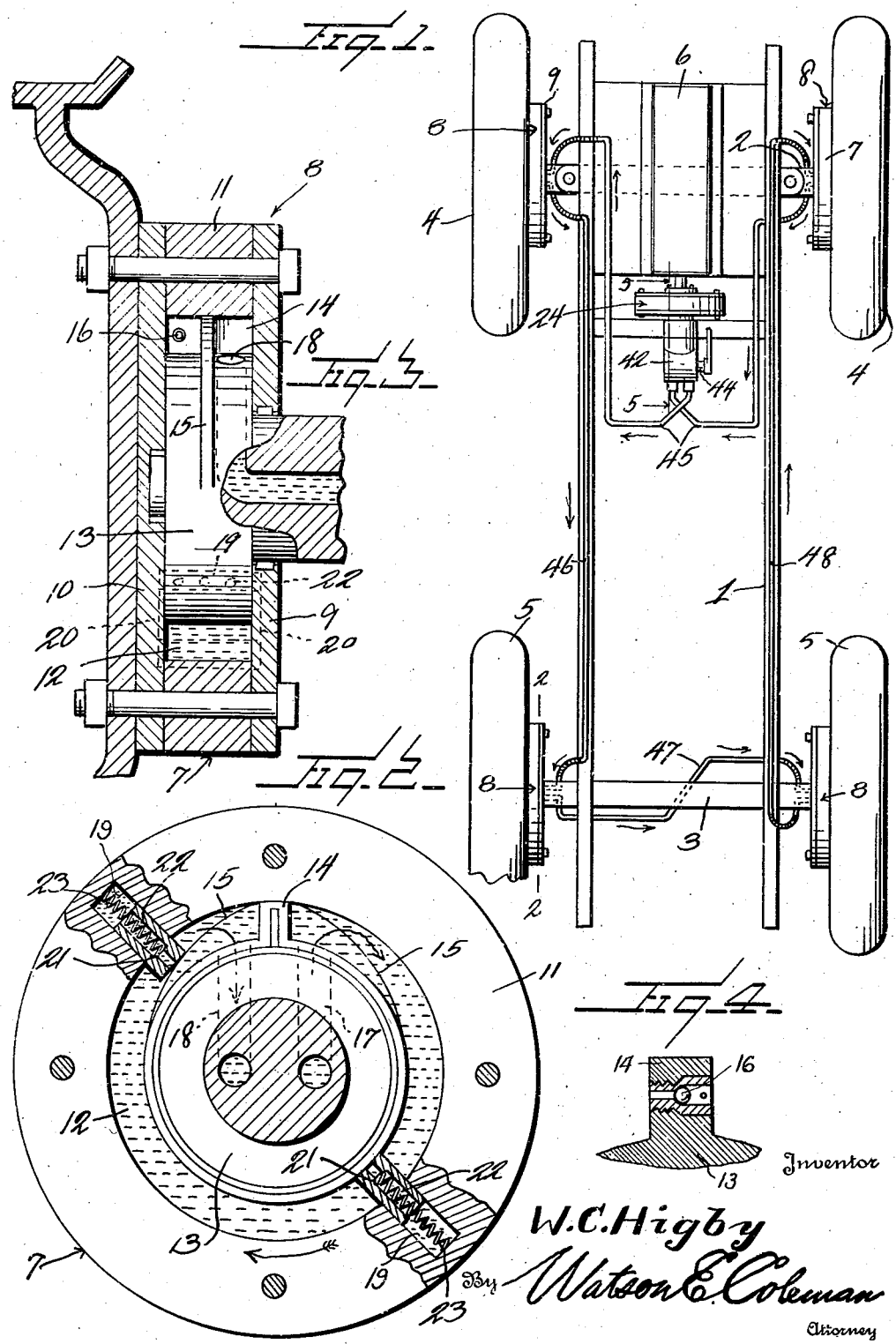
Oct. 24, 1944. W. C. HIGBY 2,361,098
FLUID DRIVING MECHANISM FOR VEHICLES
Filed July 5, 1940 2 Sheets-Sheet 1
Inventor
W. C. Higby
By Watson E. Coleman
Attorney

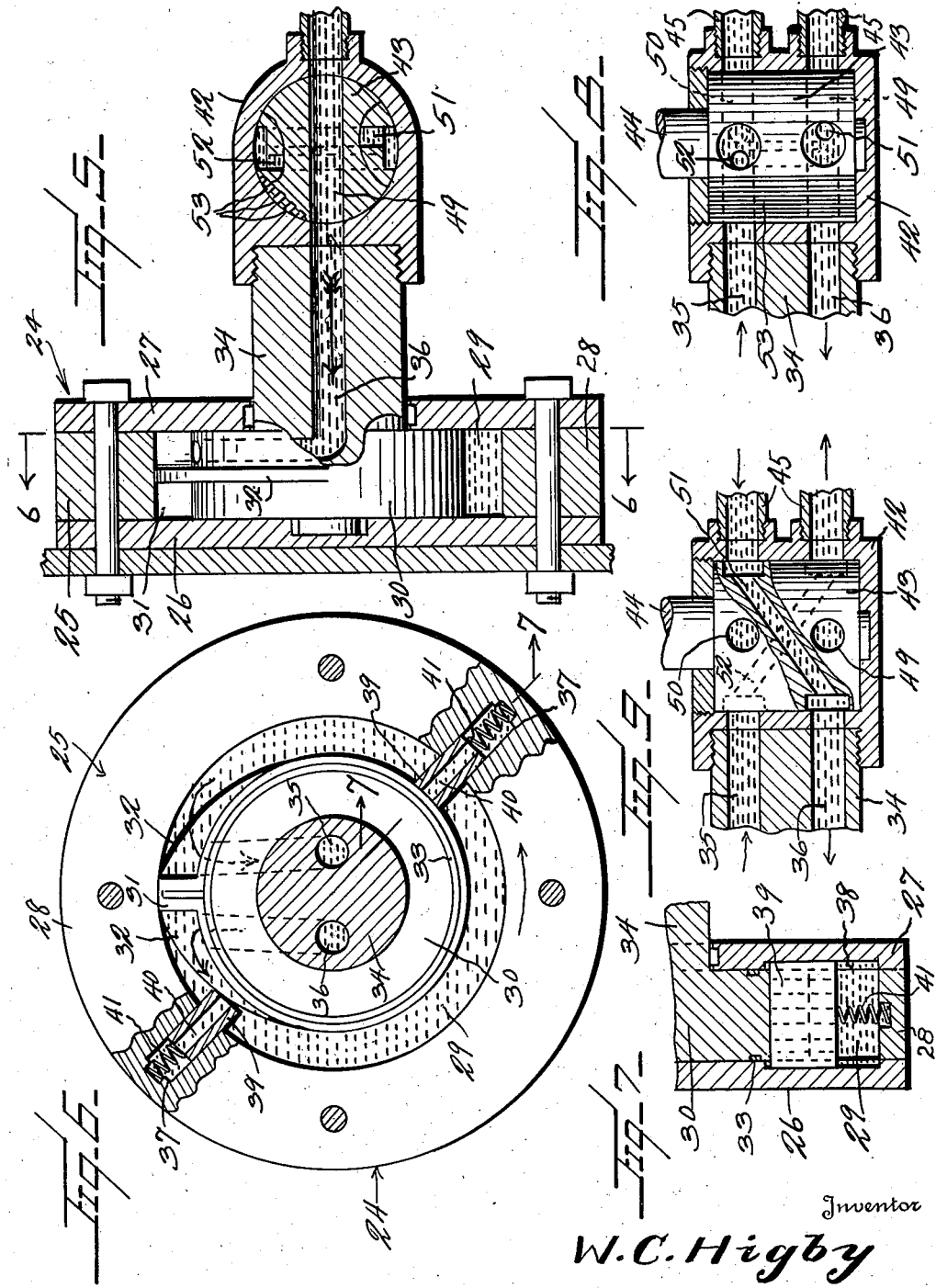

2,361,098

UNITED STATES PATENT OFFICE 2,361,098

FLUID DRIVING MECHANISM FOR VEHICLES

Willard C. Higby, Turin, N. Y.

Application July 5, 1940, Serial No. 344,179

4 Claims. (Cl. 60—53)

This invention relates to mechanism for transmitting power from a power source to driven elements hydraulically and pertains particularly to an improved hydraulic drive for wheeled or motor vehicles.

A principal object of the present invention is to provide an improved fluid or hydraulic transmission mechanism for wheeled vehicles which is so designed that power may be applied to each of the wheels of the vehicle in such a manner that each wheel will function independently of the other wheels for the moving of the vehicle so that even though one or two wheels may slip or fail to get the necessary traction, the other wheels will continue to function so as to keep the vehicle moving.

A further object of the invention is to provide a fluid power transmitting mechanism for the operation of wheeled vehicles wherein the individual power units connected with the wheels of the vehicle are connected together in series relation by a single fluid conducting line, thus making it possible to obtain traction from some of the wheels of the vehicle if others are slipping, such single fluid transmitting line being under the control of a suitable distributing valve by means of which the direction of flow of the fluid can be governed for moving the vehicle forwardly or backwardly.

Another object of the invention is to provide in a fluid transmission mechanism of the character stated wherein power transmitting units connected with the several wheels of the vehicle are joined up or connected in series, a means whereby opposite or adjacent wheels may have a differential turning rate, as when the vehicle is following a curved path, without interfering with the smooth flow of the power transmitting fluid from one unit to the other.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in plan of a vehicle chassis and supporting wheels therefor showing the mechanism of the present invention mounted thereon.

Fig. 2 is a sectional view on the line 2—2 of Fig. 1.

Fig. 3 is a sectional view taken axially through a power receiving unit showing the same mounted upon a wheel.

Fig. 4 is a sectional view through the blade of the hub of a wheel unit showing the valve mounted therein.

Fig. 5 is an axial sectional view through the fluid impeller unit and the control valve taken on line 5—5 of Fig. 1, a portion of the unit hub being in elevation.

Fig. 6 is a sectional view on the line 6—6 of Fig. 5.

Fig. 7 is a sectional view substantially on the line 7—7 of Fig. 6.

Fig. 8 is a detail sectional view of the control valve showing the fluid transfer grooves.

Fig. 9 is a view partly in section and partly in elevation of the control valve showing the fluid cross-over passages.

Referring now more particularly to the drawings, there is shown in Fig. 1, a conventionally illustrated vehicle chassis frame with supporting wheels therefor. The frame is indicated as a whole by the numeral 1 with front and rear axles 2 and 3, respectively, while the wheels for the front and rear are indicated respectively by the numerals 4 and 5. At 6 there is diagrammatically illustrated a power plant which may be in the form of the usual internal combustion engine, no details of this plant being illustrated or described since such plant may be of any standard or well-known design and it does not in itself constitute a part of the present invention.

In carrying out the present invention, the wheels 4 and 5 are not provided with the usual brake drums and other elements associated with the vehicle wheel brakes, but in place of each brake drum, each wheel has secured to its inner side concentric with the adjacent axle, an annular housing which is indicated by the numeral 7, and which forms a part of the power receiving unit, generally indicated by the numeral 8, which is associated with each wheel. Each power receiving unit housing consists of the inner and outer wall plates 9 and 10, respectively, and an interposed ring body 11 which forms an annular wall between the plates, thus providing a fluid chamber 12. Each power receiving unit 8 also includes a circular hub body 13 which is fixed to and concentrically with the adjacent axle and which is disposed centrally within the unit chamber 12 in spaced relation with the wall 11 thereof, so that the fluid chamber is in the form of an annulus, as shown in Fig. 2. The width or thickness of the hub 13 is equal to the width of the fluid chamber between the inner and outer walls 9 and 10, and as will be readily appreciated, since the housing 7 for each power receiving unit is fixed to the adjacent wheel, the housing will rotate around the hub 13 which remains stationary with the axle.

From the periphery of the hub 13 of each power receiving unit, there extends the blade 14 which has a radial extent sufficient to bring its outer or radially directed edge into contact with the inner surface of the annular portion 11 of the housing and, of course, the width of the blade is the same as the width or thickness of the hub 13, so that the ends of the blade will be in wiping contact with the inner faces of the walls 9 and 10.

Extending from the transverse center of the blade 14 upon each side thereof is a web 15 which tapers from a height equal to the height or radial extent of the blade, to the peripheral surface of the hub so as to form a cam.

In the blade 14 of each power receiving unit is a ball check valve 16 which closes in the direction of rotation of the housing 7 when the wheel with which the housing is connected is turning in a direction to carry the vehicle forwardly.

The hub 13 of each power receiving unit is provided with two radially extending passages 17 and 18 which open through the periphery of the hub into the chamber 12 at opposite sides of the blade 14. The passage 17 may be defined as the fluid inlet passage, thus making the passage 18 the fluid exhaust passage, these terms applying when the vehicle is traveling forwardly but being reversed when the vehicle is traveling backwards. They will be referred to, however, as inlet 17 and exhaust 18, being considered as though the vehicle were always traveling forwardly.

At diametrically opposite positions in the annular wall 11 of each housing, there is provided a radial slot 19 which opens into the chamber 12 and which at its two sides alines with radial grooves 20 in the inner faces of the walls 9 and 10. Each of these slots has slidably disposed therein a piston vane 21, the opposite side edges of which engage in the grooves 20 of the side walls 9 and 10. Each of the vanes is provided with a passage 22 which extends from its inner to its outer edges or radially of the unit and in this passage is secured an end of an expansion spring 23, the opposite end of which bears against the bottom of the slot 19 so as to normally urge the vane radially inwardly toward the hub. As shown, when the vanes are at the limit of their inward movement under the action of the springs 23, they contact the peripheral face of the hub and form a partition across the annular fluid chamber 12. By providing the spring passage 22 all the way through the vane from its inner to its outer edges, the fluid with which the chamber is filled, can pass into the slot behind the vane and thus assist the spring in forcing the vane inwardly to maintain a firm contact with the periphery of the unit hub.

The numeral 24 designates the fluid impeller. This unit is constructed similarly to the power receiving unit, with one exception, which is that it does not have the check valve 16 of the power receiving unit. The impeller unit comprises the housing 25 which is made up of the front and rear spaced wall plates 26 and 27, respectively, which are bolted or otherwise suitably secured to an interposed annular wall 28, thus forming a fluid chamber 29. This housing 25 is coupled with the crank or drive shaft of the power plant 6, assuming the same to be an internal combustion engine, to be rotated by the engine. Within the chamber 29 is a stationary circular hub 30, the periphery of which is spaced from the inner surface of the wall 28, thus forming the chamber 29 as an annulus and this hub has a single radially extending blade 31, the outer edge of which contacts the inner surface of the wall 28. From each side of the blade 31 at the transverse center there extends the gradually tapering web 32 which forms a cam.

The two faces of the hub 30 are provided with annular sealing rings 33 which bear against the opposing faces of the housing wall plates 26 and 27, and thus prevent loss of the propellent fluid which is under high pressure when the system is in operation.

The hub has extending from its rear face and formed integral therewith the fixed axial body 34 through which are formed the exhaust and return or inlet passages 35 and 36, respectively, which passages at their forward ends extend radially through the hub 30 to open through the periphery thereof upon opposite sides of the blade 31.

At diametrically opposite locations, the body 28 of the fluid impeller unit is provided with the radially directed slots 37 which open into the fluid chamber 29 and the faces of the wall plates 26 and 27 adjacent the slots are provided with radial grooves 38 which aline with the slots. In each of the slots 37 is a propeller vane 39 and each of these vanes has a number of passages extending therethrough from its inner to its outer edges, as indicated at 40.

Each of the slots 37 has therein an expansion spring 41 which is located behind the vane 39 and constantly urges the vane radially inwardly toward the periphery of the hub 30. As in the case of the piston vanes 21, the passages 40 of the propeller vanes 39 permit the fluid to get into the slots 37 behind the vanes and urge the vanes inwardly to assist the springs in maintaining the vanes in firmer contact with the hub.

At the rear end of the body 34, which is integral with the impeller hub 30, is a valve housing 42 in which is encased a rotary valve plug 43. This valve plug has a stem 44 which extends upwardly for connection with a suitable control rod or handle, not shown, whereby the plug may be turned to any one of three positions.

At one side of the valve housing, the fluid exhaust and return passages open through the wall of the housing while from the opposite side of the housing there extend the two pipes 45. These pipes lead from the valve housing 42, one to a fluid inlet passage 17 for one of the front power receiving units, while the other pipe 45 leads to the exhaust passage 18 for the other front power receiving unit. Assuming that the pipe 45 which carries fluid to the inlet passage 17 of one power receiving unit, leads to the front left unit, then this front left unit has the pipe 46 leading from its outlet or exhaust passage 18 rearwardly to the inlet passage 17 of the rear left power receiving unit and from the exhaust passage 18 of this left power receiving unit, there extends the pipe 47 transversely of the vehicle to the inlet passage 17 of the rear right power receiving unit and from the outlet or exhaust passage 18 of the rear right power receiving unit, the pipe 48 extends forwardly to the fluid inlet passage 17 of the right front power receiving unit. Thus it will be seen that the pipes 45, 46, 47 and 48 form with the four power receiving units a complete fluid circuit and that these power receiving units are connected in series relation.

The valve casing has therein as previously stated, the rotary plug 43, and this plug is provided with the two spaced parallel passages 49 and 50 and the two crossed passages 51 and 52, which lie in planes perpendicular to the parallel passages 49 and 50. The ends of the parallel passages and those of the crossed passages are disposed so that they may be coupled with the pipes 35 and 36 and the pipes 45, and thus when the spaced parallel passages of the valve body 43 are in service, one connecting the exhaust passage 35 with the pipe 45 leading to the front left power receiving unit and the other connecting the return or inlet passage 36 of the impeller with the pipe 45 leading to the right front power receiving unit, the fluid will be impelled through the system by the rotation of the housing 25 with respect to the hub 30, in a direction to move the vehicle forwardly, but if the valve plug 43 is given a quarter turn so that the crossed passages 51 and 52 are brought into connection respectively with the inlet and exhaust passages 36 and 35 of the impeller unit, then the fluid will flow in the reverse direction so as to move the vehicle backwardly. In other words, the fluid will then flow first to the right front power receiving unit to enter the same by way of the passage 18, previously referred to as the exhaust passage, but which now becomes the inlet passage, and then through the pipe lines 48, 47 and 46 also in reverse direction through the other power receiving units so as to drive the wheels with which the units are connected in a direction to back the vehicle.

The plug 43 of the fluid control valve unit is provided on its face with a plurality of axially extending channels or grooves 53 which are of progressively increasing depth from one side of the group to the other. These channels or grooves provide a by-pass mean when the valve plug 43 is turned so that they bridge the ends of the passages 35 and 36, so that the fluid impeller 24 may be kept operating without moving the vehicle. It will also be obvious that since this group of fluid by-pass grooves or channels 53 substantially covers the peripheral area of the plug 43 between an end of each of the straight passages 49—50 and an end of each of the crossed passages 51—52, the channels provide for the slow introduction of fluid into either the passages 49—50 or the passages 51—52 in the starting of the vehicle. This permits the vehicle to be started up at a slow rate of speed since the fluid can be caused to enter the line and also to be partially by-passed back to the return or inlet side of the impeller, thereby avoiding the sudden imposition of the full force of the moving fluid against the piston vanes of the power receiving units.

By the provision of the one-way valve 16 in the blade 14 of each of the power receiving unit hubs, it will be apparent that when the vehicle is rounding a curve where the inside wheels will turn at a slower rate than the outside wheels, this valve in each of the outside wheels which is traveling faster than the inside wheel, will open so as to permit these outside wheels to turn more rapidly as is required without affecting the proper transmission of power to the several units.

When the mechanism is operating in reverse, that is, when the control valve plug 43 is turned so as to bring the cross-over passages 51, 52 into operative relation with the impeller unit passages 35, 36, the valves in the blades of the power receiving units will be open. Due to the fact that these valve passages 16 are much smaller than the fluid conducting conduits, the vehicle will go much slower in reverse than it will go when it is being driven forwardly, but the desired backward movement will, nevertheless, be obtained.

From the foregoing, it will be seen that the driving mechanism embodying the present invention is of relatively simple design and that it involves a minimum of movable parts and is, therefore, less likely to get out of order through the wearing of the moving parts than other fluid drive devices. Also it will be observed that all of the power receiving units are connected in series as a result of which if one of the wheels contacts a slippery surface and, therefore, turns without producing any traction action, the motive power will be continuously supplied to the other power receiving units and, therefore, the vehicle will continue to go forward under proper control. In other fluid drive mechanisms, the power units are connected in a parallel relation with the result that if one of the wheels should rotate freely or slip, the operator of the vehicle would be incapable of controlling the machine.

What is claimed is:

1. In a fluid drive mechanism for a vehicle having supporting wheels, a fluid impeller having two ports constituting inlet and exhaust ports, a power receiving unit for each of said wheels, said power receiving unit including a housing providing a circular fluid chamber and secured to the wheel for concentric rotation therewith, a hub secured concentrically with the wheel and held against rotation and disposed within and coaxially of the housing chamber, radially movable vanes carried by each power unit housing and extending into the fluid chamber for contact with the periphery of the hub, a blade carried by each power unit hub and extending radially through the fluid chamber, means associated with said blade at each side face thereof facilitating the movement of the vanes over the blade, a first fluid port for each power unit chamber entering the chamber on one side of the blade and functioning as an inlet port for one direction of drive, a second fluid port for each power unit chamber entering the chamber on the other side of the blade, and functioning as an outlet port for the said one direction of drive, the first and second ports becoming respectively outlet and inlet ports for reverse drive, means connecting the impeller and power unit chambers in series in a continuous fluid line comprising a first conduit connected to a first port of one power unit chamber, conduits connecting the second port of all but the last of the power unit chambers with the first port of the succeeding power unit chamber and a final conduit connected to the second port of the last power unit chamber, and means for alternatively directing the fluid from the exhaust port of the impeller to the first or final conduit and from the final or first conduit to the inlet port of the impeller.

2. A fluid power transmitting mechanism for a vehicle having supporting wheels, comprising a fluid impeller unit having inlet and exhaust ports, a power receiving unit for driving each of said wheels and including a stationary member and a rotating member, the latter member being connected with the wheel, each of said power receiving units being free of mechanical driving connection with the other units, means providing expansible fluid chambers between the stationary and movable members of the power receiving units, means for introducing fluid into and exhausting fluid from the expansible chambers of the power receiving units, a single fluid line connecting the chambers of the power receiving units in series relation with the inlet and exhaust ports of the impeller unit, means whereby a differential action between the wheels and the rotating power unit members carried thereby may take place without stopping the movement of fluid through the line and valve means for controlling the flow of fluid through said conduit.

3. A fluid propelling mechanism for a wheel supported vehicle, comprising a fluid impeller unit having a driven rotating portion having a circular chamber and a stationary portion in the chamber, oppositely positioned retractible piston vanes carried by said rotating portion and movable radially with respect to the stationary portion, means normally urging the vanes toward the stationary portion, a fixed radial blade carried by the stationary portion in the chamber between the vanes, means carried by said stationary portion upon each side of said blade for alternately shifting said vanes outwardly for the passage of the blade past the vanes, an inlet port extending through said stationary portion into the fluid chamber upon one side of the radial blade, an outlet port extending through the stationary portion into the fluid chamber upon the other side of the radial blade, a power receiving unit for each of said wheels and including a rotating body secured directly to the wheel and having a circular chamber and a stationary body within the chamber of the rotating body, a fixed blade carried by the stationary body in the chamber, radially movable piston vanes carried by the rotating body and coacting with the fixed blade of the stationary body to form expansible fluid chambers, means constantly urging the piston vanes in toward the stationary body, the fluid chamber of each power receiving unit having fluid ports opening thereinto from the stationary body upon opposite sides of the blade thereof, conduits connecting the ports of the several units to form a single continuous fluid line including therein the chambers of the units whereby all of the units have their fluid chambers connected together at all times in series relation for the continuous movement of fluid in one direction from the impeller unit to the power units and back to the impeller unit, and a reversing valve connected between the inlet and outlet ports of the impeller unit in the fluid line for reversing the flow of fluid in the line.

4. A fluid power transmitting mechanism for a vehicle having supporting wheels, comprising a fluid impeller unit having inlet and exhaust ports, a power receiving unit for each of said wheels and including a stationary member and a rotating member, the latter member being connected to turn with the wheel, means providing expansible fluid chambers between the stationary and movable members of the power receiving units, means for introducing fluid into and exhausting fluid from the expansible chambers of the power receiving units, fluid conducting conduits connecting the chambers of the power receiving units in series relation with the inlet and exhaust ports of the impeller unit whereby the fluid flows at all times directly from one side of the impeller to and through the chambers of all of the power units and back to the other side of the impeller, valve means for controlling the flow of fluid through said line, and check valve means forming a part of the stationary member of each power receiving unit for by-passing a portion of the fluid from one of the expansible chambers to the other chamber of each power unit upon the turning of the rotating member of any unit at a greater speed than the speed of rotation of the rotating member of the other units.

WILLARD C. HIGBY.